March 14, 1950  C. E. PELLOW ET AL  2,500,376
NUT FEED FOR CASTELLATING MACHINES
Filed April 18, 1946
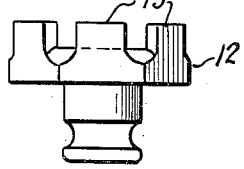
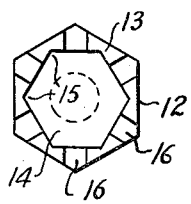
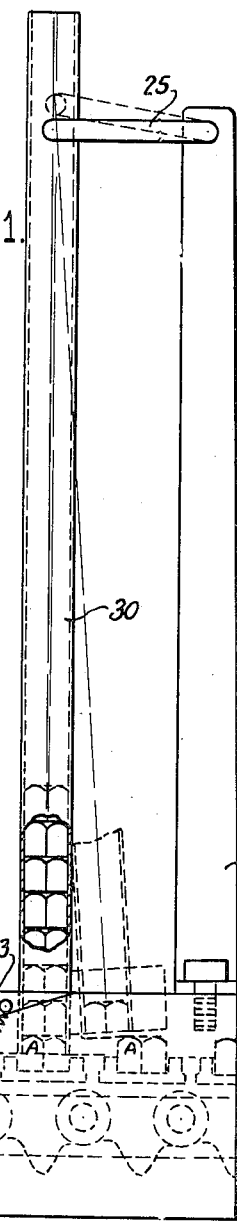
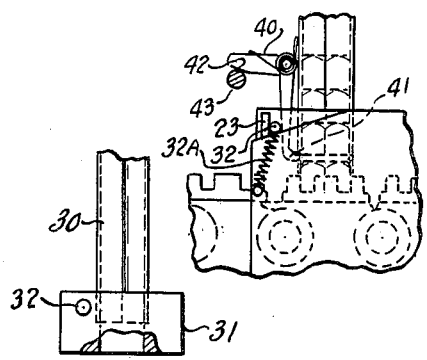
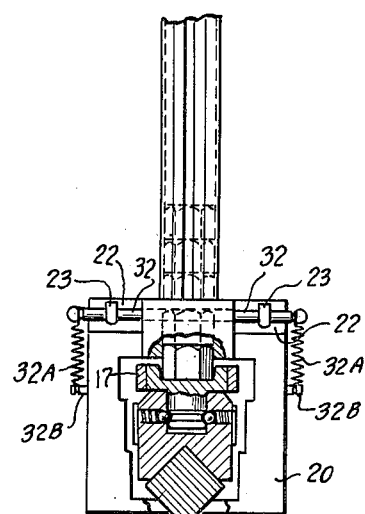
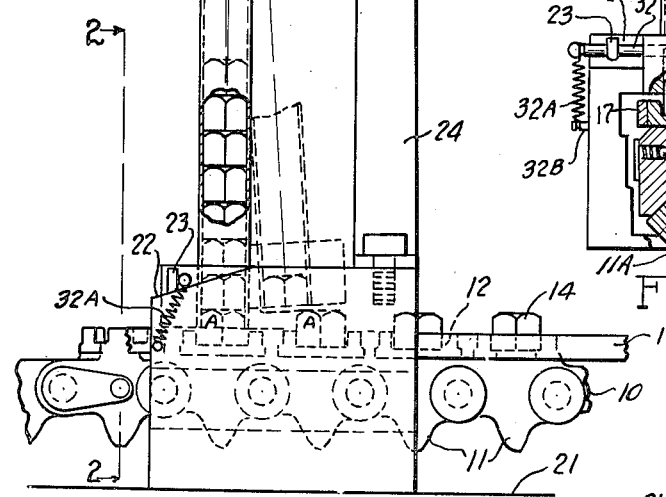
INVENTOR.
Charles E. Pellow
Charles S. Pellow
BY
Hauke T. Hardesty Patented Mar. 14, 1950

2,500,376

UNITED STATES PATENT OFFICE 2,500,376

NUT FEED FOR CASTELLATING MACHINES

Charles E. Pellow and Charles S. Pellow,
Detroit, Mich.

Application April 18, 1946, Serial No. 662,999

5 Claims. (Cl. 10—162)

The present invention relates to nut feeding means for castellating machines, and especially to feed means for such machines as shown in Patent No. 1,624,180, issued April 12, 1927, to Charles E. Pellow on Castellating machine.

Among the objects of the present invention is a feeding device that is simple in construction and operation and which is unlikely to get out of order.

Another object is feeding means that will automatically insert the nuts in their proper position in the conveyor means as the latter moves along to carry them under the cutters.

Still other objects and advantages will be apparent to those skilled in the art upon reference to the following description and the accompanying drawings in which Fig. 1 is a side elevation of a feed means constructed according to the present invention.

Fig. 2 is an end elevation but showing a conveyor link in vertical section on line 2—2 of Fig. 1.

Fig. 3 is a detail of the lower end of the feed chute.

Fig. 4 is a side elevation of one of the nut holders.

Fig. 5 is a plan view of the same.

Fig. 6 is a side elevation of a modification.

In the above mentioned patent, the castellating machine is shown to include a conveyor carrying the nuts under a series of saws or cutters, the nuts being carried in individual holders or chucks carried by the conveyor and mounted to allow indexing between the cutters.

Because of the required accurate positioning of the chucks and of the nuts in the chucks, it has heretofore been customary to place the nuts in the chucks by hand and, therefore, the constant presence of an attendant or operator was required.

The present device is designed to do such placing of the nuts from a considerable store of nuts loaded into the feed means.

In the drawings, the conveyor 10 is, as shown in the patented machine, made up of a series of links 11 pivoted together and traveling along a guide rail 11A, and each link carries a holder or chuck 12 of the form shown in Fig. 4.

This consists of a hexagonal head portion including upstanding fingers 13 arranged at the flat sides thereof and adapted to hold a nut 14, the corners of the nut being set in notches 15 in the fingers, so as to present flat sides of the nut to the spaces 16 between the fingers. This arrangement presents the flat sides of the chuck laterally of the line of motion of the conveyor, and to suitable guide bars 17 adapted to maintain the nuts 14 in proper alignment as they pass under the cutters and also as they pass under the feed means.

The feed means is shown in Figs. 1, 2 and 3 to consist of a base portion 20 mounted on the machine base 21 and provided with a passage of sufficient size to allow the conveyor 10 and guide bars 17 to pass through it. This base member 20 extends to somewhat above the conveyor and is open at the top for the greater portion of its length. At its forward end, the two upstanding side walls are provided with sloping portions 22, at the lower ends of which are suitable stop pins 23.

Fixed to the rearward end of base 20 is an upright 24 having at its top suitable means such as a pivoted link 25, by means of which it supports in upright position magazines in the form of a feed chute 30, but permits a small vertical and swinging movement of the latter.

The magazine or feed chute 30 is of such size and shape as to receive a considerable number of nuts stacked therein, one upon the other and allow them to move downward easily by their own weight when one is removed from the bottom end.

At the bottom the chute 30 is provided with a block 31, having a vertical passage registering with the inside of chute 30 and also of such lateral dimension as to pass between the side walls of base 20 and be guided thereby in its movements.

Extending laterally from block 31 are a pair of pins 32. These, of course, may be in the form of a single pin extending through and projecting from the block, and this construction is illustrated. The pins 32 rest upon the sloping surfaces 22 of the base 20.

In the operation of the feed means, assuming a plurality of nuts 14 to have been placed in the chute 30 and the conveyor 10 in motion from left to right (Fig. 1), the chute 30 assumes the full line position of Fig. 1 and the bottom nut A will either rest temporarily in the top of fingers 13 or will drop into position in the notches 15.

When the nut A drops into position in the chuck 12, it is still partly within chute 30, or block 31, and as the conveyor moves toward the right (Fig. 1), the chute and block 31 are drawn along with it, but as the pins 32 ride up the sloping surfaces 22, the chute and block arrive at the dotted line position of Fig. 1 in which the nut A is entirely out of the block and the pins 32 are at the upper ends of surfaces 22.

From this position, the weight of the chute 30, block 31, and the contained nuts, assisted by suitable springs 32A, causes them to slide down the surfaces 22, to the full line position against the stops 23, and the next nut drops into the next chuck. The springs 32A are attached to the pins 32 and anchored to the base 20 by means of suitable pins 32B.

In the slotting of nuts of another size, the chucks 12 will of course be changed to accommodate such nuts and a chute of the proper size will also be used. The operation will be the same.

However, if nuts smaller than the space between chucks are to be slotted, means must be provided to hold the nut next to the one being dropped into a chuck, from dropping down and getting caught between chucks as the chute moves back to position after release of a nut.

Such means is shown in Fig. 6, in which a spring actuated detent or latch 40 is mounted on the chute 30 or block 31 and provided with a short finger 41 adapted to extend into the nut passage and prevent the downward movement of the remaining nuts when the lowermost one is being released by the lateral movement of the chute and block.

The free end of the latch will be provided with a cam surface 42 and a suitable fixed element 43, mounted on the base 20 or elsewhere, is so located that the latch will be actuated to release the nut supply when the chute and block return to loading position. As soon as the chute starts to move, the latch is spring actuated to active nut holding position.

Now having described the invention and the preferred embodiment thereof, it is to be understood that said invention is to be limited, not to the specific details herein set forth, but only by the scope of the claims which follow.

We claim:

1. In combination with the conveyor and chucks of a nut castellating machine, a nut holding chute positioned over said conveyor and adapted to register with said chucks as they pass beneath said chute, said chute extending closely adjacent to the upper faces of said chucks, whereby a nut dropping from said chute into a chuck remains partially in said chute, supporting means for said chute adapted to permit the conveyor to move the lower end of the chute, means to lift the latter to free it from said nut and means operable to return said chute to its original position after it has been lifted clear of the nut deposited in the chuck.

2. In combination with the conveyor and chucks of a castellating machine, a chute adapted to hold nuts in stacked relation and arranged vertically over and with its lower end closely adjacent the upper faces of the chucks passing beneath, supporting means for said chute, adapted to maintain the vertical arrangement, and means to lift said chute from a nut passing from said chute into a chuck.

3. In combination with the conveyor and chuck of a nut castellating machine, a base member having an upright portion on each side of said conveyor, said portions each being provided with an inclined surface, a nut magazine in alignment with the line of chucks and provided with projecting members resting on said surfaces, and means coacting with the upper end of said magazine for maintaining the latter in an upright position with its lower end closely adjacent the upper faces of said chucks when said projecting members are at the lower portions of said inclined surfaces.

4. In combination with the conveyor and chucks of a nut castellating machine, a nut holding chute positioned over said conveyor and adapted to register with said chucks as they pass beneath said chute, said chute extending to closely adjacent the upper faces of said chucks, whereby a nut dropping from said chute into a chuck remains partially in said chute, supporting means for said chute adapted to permit the conveyor to move the lower end of the chute, means to lift the latter as it is being moved by the conveyor, and means for returning said chute to its original position after it has been lifted clear of the nut deposited in the chuck, and means for preventing movement of the nuts remaining in said chute during said return.

5. In a castellating machine provided with a traveling conveyor having a plurality of chucks for holding nuts to be slotted, feed means for inserting nuts into said chucks, said feed means comprising a chute adapted to contain a supply of nuts in stacked relation and arranged when in feeding relation in vertical axial alignment with one of said chucks but spaced therefrom such a distance that a fed nut is partially in said chute and partially in said chuck, mounting means for said chute permitting the movement of the delivery end of said chute with said chuck, means for lifting said chute free of said fed nut during said movement, and means for returning said chute to a position of alignment with a succeeding chuck.

CHARLES E. PELLOW.
CHARLES S. PELLOW.

REFERENCES CITED

The following references are of record in the file of this patent:

UNITED STATES PATENTS

| Number | Name | Date |
|---|---|---|
| 1,402,901 | Shaw | Jan. 10, 1922 |
| 2,357,888 | Gookin | Sept. 12, 1944 |